United States Patent
Murakami et al.

(10) Patent No.: US 6,920,782 B2
(45) Date of Patent: Jul. 26, 2005

(54) PERSONAL-WATERCRAFT TESTING APPARATUS

(75) Inventors: Masatoshi Murakami, Hamamatsu (JP); Yasuo Torii, Hamamatsu (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 310 days.

(21) Appl. No.: 10/305,730

(22) Filed: Nov. 26, 2002

(65) Prior Publication Data

US 2003/0097890 A1 May 29, 2003

(30) Foreign Application Priority Data

Nov. 29, 2001 (JP) ........................................ 2001-364170

(51) Int. Cl.[7] .......................................... G01M 19/00
(52) U.S. Cl. .................................................... 73/117.1
(58) Field of Search ........................... 73/117.1, 865.6; 114/230.1

(56) References Cited

U.S. PATENT DOCUMENTS 3,240,056 A * 3/1966 Read ......................... 73/117.1
3,543,573 A * 12/1970 Hunziker .................... 73/117.1
4,903,961 A * 2/1990 Solymosi ...................... 482/73
6,283,805 B1 * 9/2001 Ishigaki ........................ 440/46
6,293,836 B1 * 9/2001 Blanchard ..................... 440/47

FOREIGN PATENT DOCUMENTS

JP        11-132898 A        5/1999

* cited by examiner

*Primary Examiner*—Robert Raevis
(74) *Attorney, Agent, or Firm*—Rankin, Hill, Parter & Clark LLP (57) ABSTRACT

Personal watercraft to be test is set in a water tank. Water flow guide plate is positioned, rearward of the stern of the watercraft, for guiding a water jet from the watercraft to make a U-turn toward a front portion of the watercraft. Vertical partition plate is positioned, centrally of the width of an underwater portion of the tank, for directing the water jet to horizontally circulate around the partition plate. In another example, water flow guide plates are provided, at four corners of the underwater portion, for sequentially guiding the water jet from the watercraft to form a vertical circular water flow, and a horizontal partition plate is provided, centrally of the height of the underwater portion, for directing the water jet to vertically circulate around the partition plate.

6 Claims, 7 Drawing Sheets

PERSONAL-WATERCRAFT TESTING APPARATUS

FIELD OF THE INVENTION

The present invention relates to apparatus for testing a personal watercraft using a water tank.

BACKGROUND OF THE INVENTION

Example of a water tank intended for watercraft tests or inspections is known from Japanese Patent Laid-open Publication No. HEI-11-132898 disclosing a circular water flow tank and water-flow-rate adjusting method. The disclosed circular water flow tank includes an open water passage having its front and rear ends connected in fluid communication with each other via a closed water passage, and a water circulating pump disposed in the closed water passage. The disclosed circular water flow tank also includes a water-flow-rate varying means disposed in a boundary opening between the open and closed water passages, and the water-flow-rate varying means is operable to increase or decrease the height of the boundary opening and thereby control the depth of water flowing from the closed water passage to the open water passage. By the water-flow-rate varying means thus controlling the water depth, the circular water flow tank can avoid occurrence of undesired hydraulic jumps and perform appropriate water flow rate adjustment with very smooth water surface variation. Therefore, the disclosed circular water flow tank can be used suitably for testing or inspecting a watercraft.

However, the disclosed circular water flow tank, where the water circulating pump is provided in the closed water passage, is unsatisfactory in that, when the propulsion of the watercraft is great, the pump would become significant resistance to the water flow in the closed water passage, so that a proportion of the water tends to stagnate between the rear of the watercraft and the pump. When a great amount of the water stagnates between the rear of the watercraft and the pump, the performance test of the watercraft could not be performed under generally the same conditions as actual use (operating) conditions of the watercraft. If the closed water passage and water circulating pump are increased in size with a view to avoiding the inconvenience, the overall cost of the circular water flow tank would increase.

SUMMARY OF THE INVENTION

In view of the foregoing prior art problems, it is an object of the present invention to provide an improved personal-watercraft inspection apparatus which can test the performance of a personal watercraft using a water tank under generally the same conditions as actual use (operating) conditions of the watercraft.

To accomplish the above-mentioned object, the present invention provides a personal-watercraft testing apparatus which comprises: a water tank for setting therein a personal watercraft to be tested; a water flow guide plate, positioned rearward of a stern of the personal watercraft, for guiding a water jet emitted from the personal watercraft to make a U-turn toward a front portion of the personal watercraft; and a vertical partition plate, positioned generally centrally of a width of an underwater portion of the water tank and extending vertically in the underwater portion, for directing the water jet, guided by the water flow guide plate, to form a horizontal circular water flow circulating horizontally in the water tank around the vertical partition plate.

The water flow guide plate functions to guide the water jet from the personal watercraft to make a U-turn toward a front portion of the personal watercraft to be tested. Then, the vertical partition plate leads the water jet, having been U-turned by the water flow guide plate, toward the front portion of the personal watercraft and thereby forms a horizontal circular water flow horizontally in the water tank around the vertical partition plate. Such arrangements can effectively prevent the water jet of the watercraft from undesirably returning to the stern of the watercraft and stagnating at or near the stern after striking any of side plates of the water tank.

In the personal-watercraft testing apparatus of the invention, the personal watercraft to be tested is set in the water tank along one surface of the vertical partition plate, and the water flow guide plate may have an arcuate shape convexly curved outwardly of the water tank.

According to another aspect of the present invention, there is provided a personal-watercraft testing apparatus which comprises: a water tank for setting therein a personal watercraft to be tested; water flow guide plates, respectively provided at four corners, as viewed sideways, of an underwater portion of the water tank, for sequentially guiding a water jet emitted from the personal watercraft to form a vertical circular water flow; and a horizontal partition plate, provided generally centrally of a height of the underwater portion of the water tank and extending horizontally in the underwater portion, for directing the water jet, guided by the water flow guide plates, to vertically circulate around the horizontal partition plate.

The water flow guide plates sequentially guide the water jet from the personal watercraft to flow from near the water surface downward toward the bottom of the water tank and then from the tank bottom upward toward the front of the watercraft, to thereby produce a vertical circular water flow circulating in the water tank around the horizontal partition plate. At that time, the horizontal partition plate provided generally centrally of the height of the underwater portion of the tank functions to lead the water jet toward the front of the watercraft while preventing the water from going up partway through the travel along the water tank bottom. As a result, the present invention can effectively prevent the water jet of the personal watercraft from undesirably returning to the stern of the watercraft and stagnating at or near the stern after striking any of side plates of the water tank.

BRIEF DESCRIPTION OF THE DRAWINGS

Certain preferred embodiments of the present invention will hereinafter be described in detail, by way of example only, with reference to the accompanying drawings, in which.

DETAILED DESCRIPTION OF THE PREFERRED EMBODIMENTS

Figure 1:
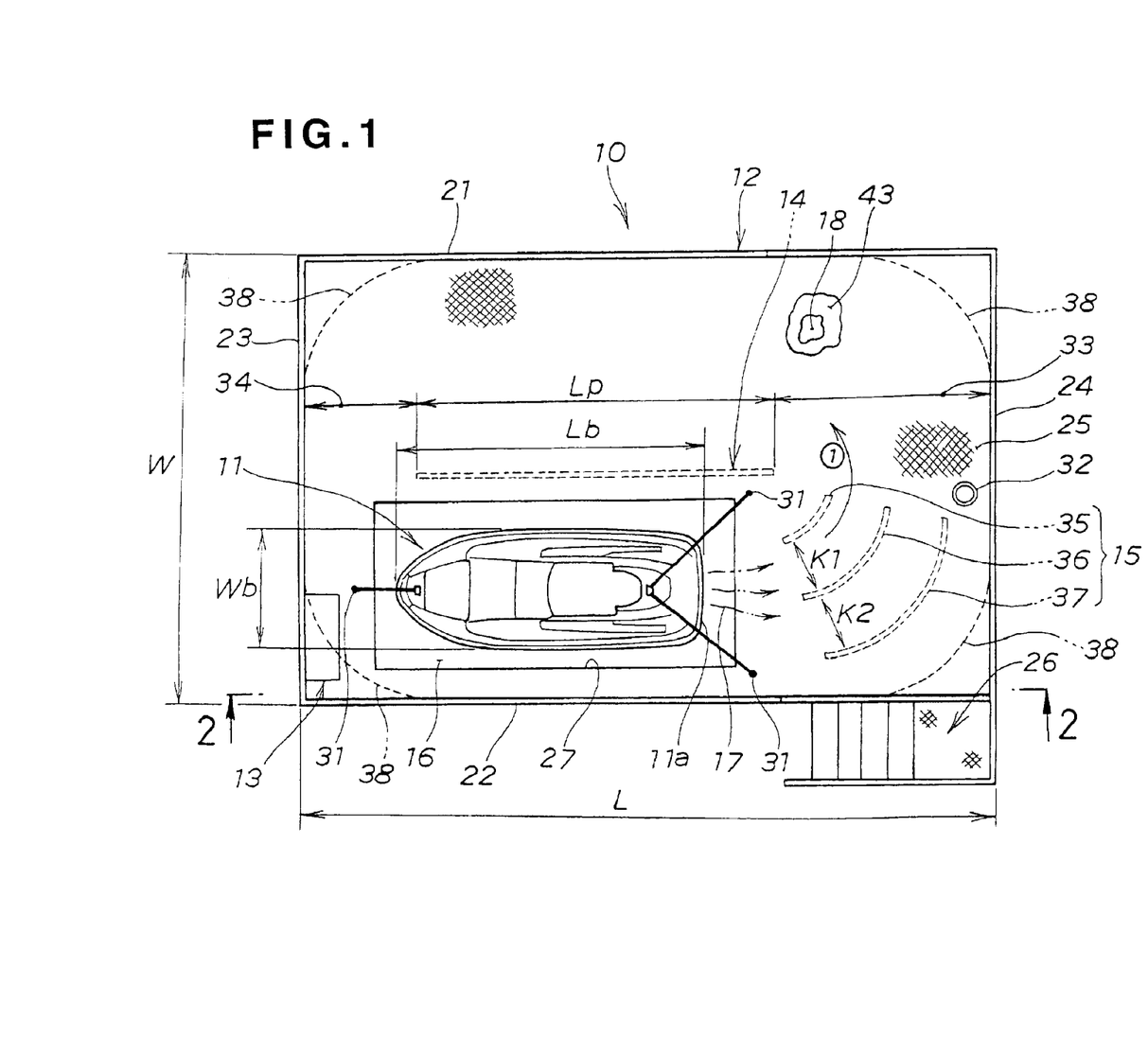
FIG. 1 is a plan view of a personal-watercraft testing apparatus in accordance with a first embodiment of the present invention.

FIG. 1 is a plan view of a personal-watercraft testing apparatus 10 in accordance with a first embodiment of the present invention. The personal-watercraft testing apparatus 10 includes a water tank 12 for setting therein a personal watercraft 11 to be tested, a display device 13 for visually displaying thereon predetermined items, a vertical partition plate 14 disposed in the water tank 12, and a water flow guide 15. Reference numeral 16 represents water contained in the water tank 12, and 43 the water surface.

The personal watercraft 11 to be tested is of a type which glides over a water surface by forcing out or emitting a jet of water 17 rearwardly of its stern 11a. The personal watercraft 11 has a length Lb, width Wb and height Hb.

The water tank 12 includes a rectangular bottom plate 18, first, second third and fourth side plates 21, 22, 23, 24 extending upward from the respective sides of the bottom plate 18, and a top plate 25 secured to the upper ends of the first to fourth side plates 21–24. Reference numeral 26 denotes a stairway.

The water tank 12 has a length L that is at least twice as great as the length Lb of the personal watercraft 11, and a width W that is at least twice as great as the width Wb of the personal watercraft 11.

The top plate 25 of the water tank 12 has an opening 27 greater in size than the personal watercraft 11 to be tested, and three locking members 31 are attached to the top plate 25 at three different points near an edge portion thereof defining the opening 27. Exhaust pipe 32 is provided on the top plate 25 adjacent to the fourth side plate 24. The exhaust pipe 32 has an intake means (not shown), via which exhaust gas from the personal watercraft 11 set in the water tank 12 is discharged.

The vertical partition plate 14 is provided for forming a horizontal circular water flow in a direction of arrow (1) in conjunction with the water flow guide 15, as will be described below. Specifically, the vertical partition plate 14 is disposed substantially centrally of the width W (generally at a "W/2" position) of the water tank 12—to be more specific, substantially centrally of the width of an underwater portion of the tank 12—and has a length Lp. Also, a water inflow portion 33 is formed adjacent to one end of the vertical partition plate 14, and a water outflow portion 34 is formed adjacent the other end of the plate 14.

Further, the water flow guide 15 is disposed rearward of the watercraft stern 11a and in a path of the horizontal circular water flow, so as to guide the water jet from the personal watercraft 11 to make a U-turn toward a front portion of the watercraft 11. The water flow guide 15 comprises three vertical curved guide plates 35 to 37 that are installed on the bottom plate 18 of the water tank 12 and opposed to each other in spaced apart relation. Namely, the water flow guide 15 comprises: the first vertical curved guide plate 35; the second vertical curved guide plate 36 positioned at a distance K1 from the first vertical curved guide plate 35; and the third vertical curved guide plate 37 positioned at a distance K2 from the second vertical curved guide plate 36. A plurality of water-stagnation preventing plates 38, each having an arcuate shape convexly curved outwardly of the water tank 12, are disposed at four corners, as viewed in plan, of the water tank 12.

Figure 2:
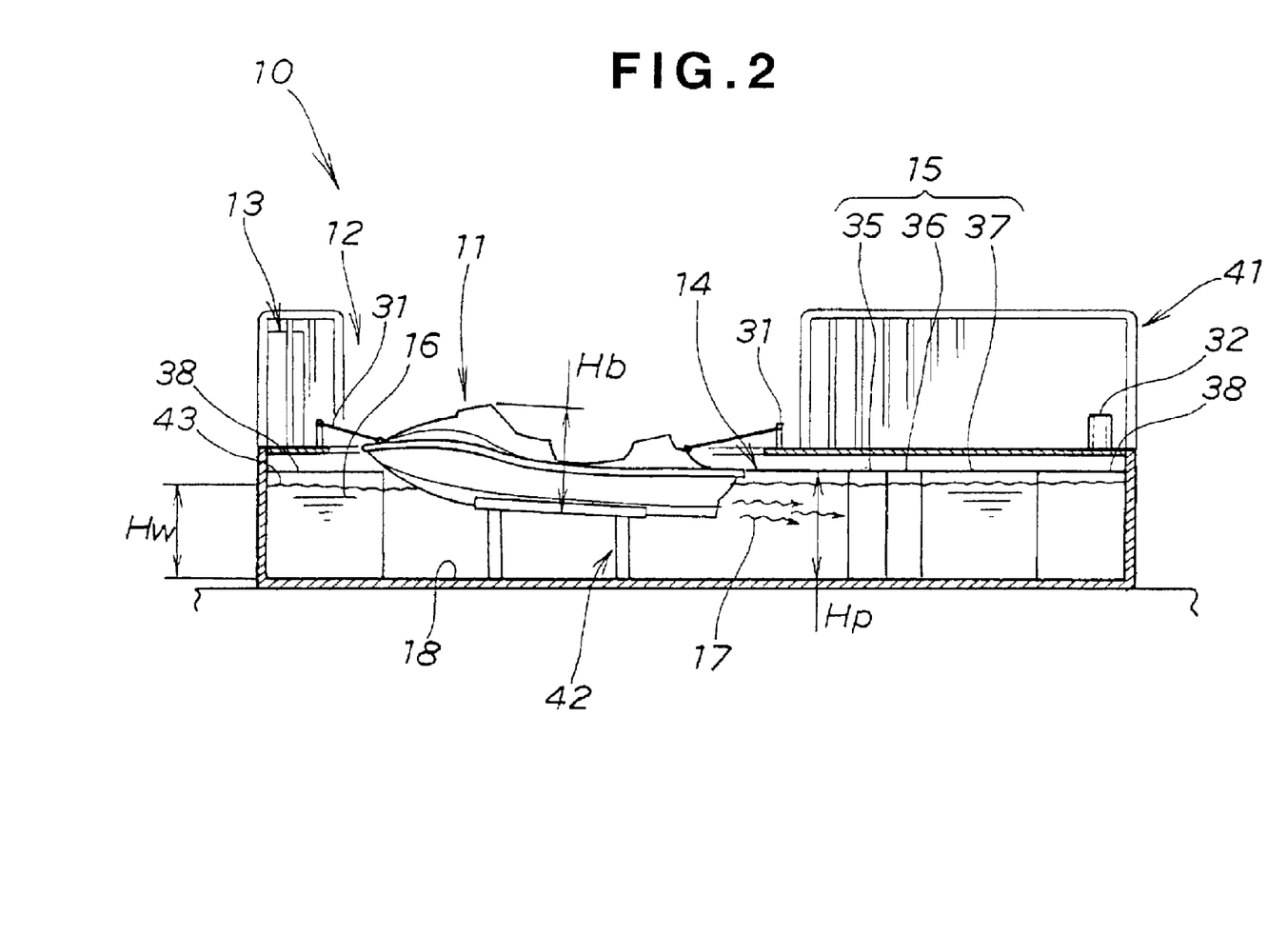
FIG. 2 is a sectional view of the personal-watercraft testing apparatus taken along the 2—2 line of FIG. 1.

FIG. 2 is a sectional view of the personal-watercraft testing apparatus 10 taken along the 2—2 line of FIG. 1, which particularly shows the personal watercraft 11 to be tested, water tank 12, water 16, vertical partition plate 14, water flow guide 15 (first to third vertical curved guide plates 35 to 37), and water-stagnation preventing plates 38. In this figure, 41 represents a safety fence, and 42 a testing stage on which the personal watercraft 11 is set.

As illustrated in FIG. 2, the water level in the tank 12 is set to a value "Hw", and the vertical partition plate 14 has a height Hp higher than the water level Hw (Hp>Hw). The water flow guide 15 and water-stagnation preventing plates 38 have the same height as the partition plate 14.

Steps to test the personal watercraft in the instant embodiment may be outlined as follows. First, a finished personal watercraft 11 to be tested is placed in the water tank 12 previously filled with water 16, and the personal watercraft 11 is installed on the testing stage 42 fixed in the underwater portion of the tank 12. Then, the personal watercraft 11 is locked in its front and rear portions by the locking members 31 (FIG. 1), and it is connected to cables of measuring devices etc. After that, the engine of the personal watercraft 11 thus set in the water tank 12 is activated to force out a jet of water 17, and a measurement is made, for example, of the output of the personal watercraft 11.

Figure 3:
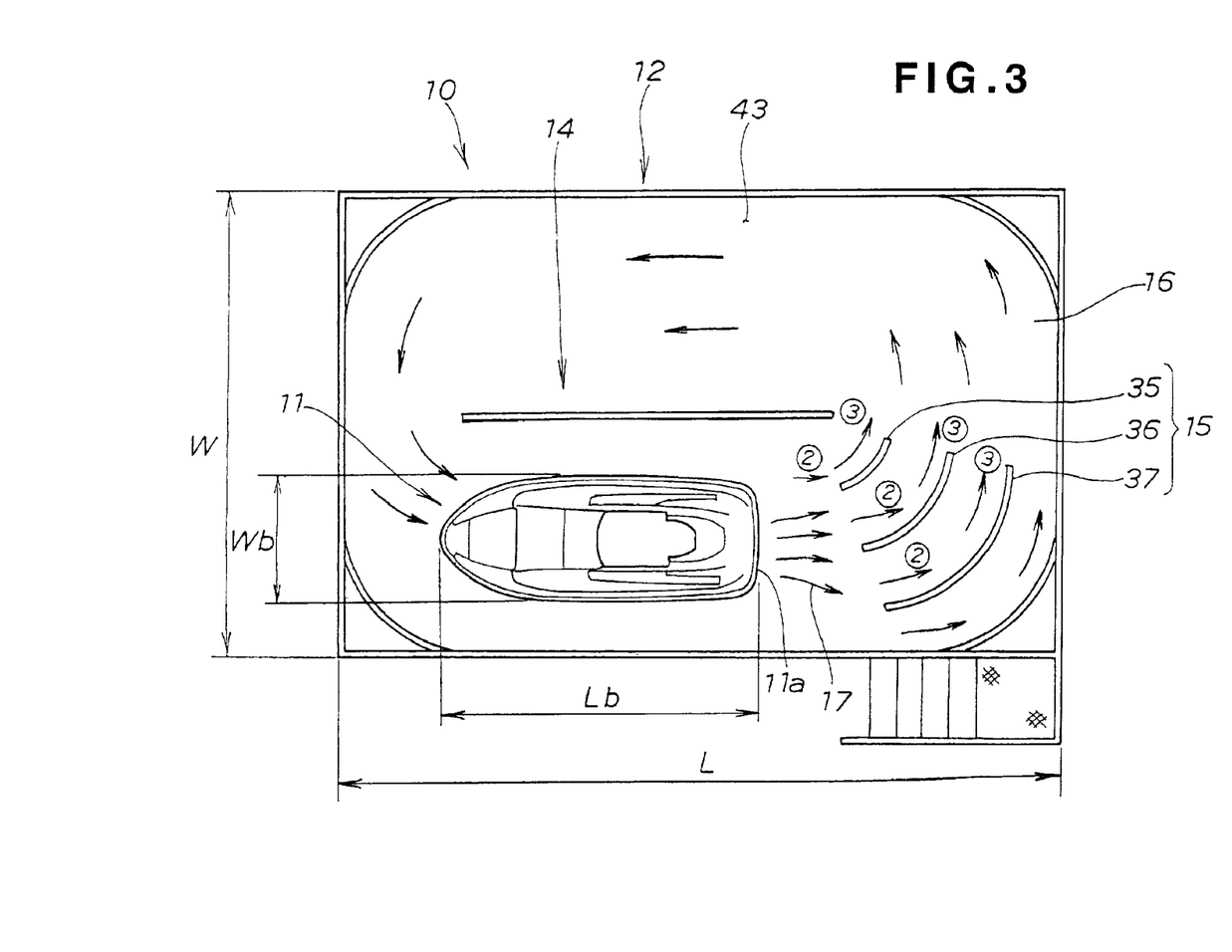
FIG. 3 is a view explanatory of behavior of the personal-watercraft testing apparatus of FIG. 1.

Now, a description will be made about behavior of the personal-watercraft testing apparatus 10 constructed in the above-described manner, with primary reference to FIG. 3.

As the personal watercraft 11 forces out the water jet 17 rearward of the stern 11a, the water jet 17 strikes the first to third vertical curved guide plates 35 to 37 of the water flow guide 15 as denoted by arrows (2) and is thus guided by the guide plates 35 to 37 to make a U-turn as denoted by arrows (3), so that a horizontal circular flow is produced in the water 16. Leading portion of the water flow is then directed along the vertical partition plate 14 to the front of the watercraft 11 without forming vortical currents in a center area of the water tank 12, so that the horizontal circular flow can last without encountering any significant resistance.

Namely, the personal-watercraft testing apparatus 10 is characterized by including: the water tank 12 having the length L at least twice as great as the length Lb of the personal watercraft 11 and the water surface 43 (underwater portion) of the width W at least twice as great as the width Wb of the personal watercraft 11; the vertical partition plate 14, disposed substantially centrally of the width W of the underwater portion of the tank 12, for forming a horizontal circular water flow in the water tank 12; and the water flow guide 15, disposed rearward of the stern 11a of the personal watercraft 11 and in the path of the horizontal circular water flow, for guiding the water jet 17 from the watercraft 11 to make a U-turn toward the front portion of the personal watercraft 11. Such arrangements can form an appropriate circular water flow and thereby effectively prevent the water jet 17, forced out by the watercraft 11, from returning directly to the stern 11a and stagnating at or near the stern 11a after striking any of the side plates of the water tank 12, with the result that the personal-watercraft testing apparatus 10 can test the performance of the personal watercraft 11 under generally the same conditions as the actual use or operating conditions of the watercraft 11.

Further, by the use of the water tank 12 having the length L at least twice as great as the length Lb of the personal watercraft 11 and the water surface 43 of the width W at least twice as great as the width Wb of the personal watercraft 11, the water tank 12 can have a reduced height, which therefore can reduce the overall height of the testing apparatus 10. As a result, the personal-watercraft testing apparatus 10 can be installed in factories having buildings of relatively low heights or using cranes of relatively low profiles.

Figure 4:
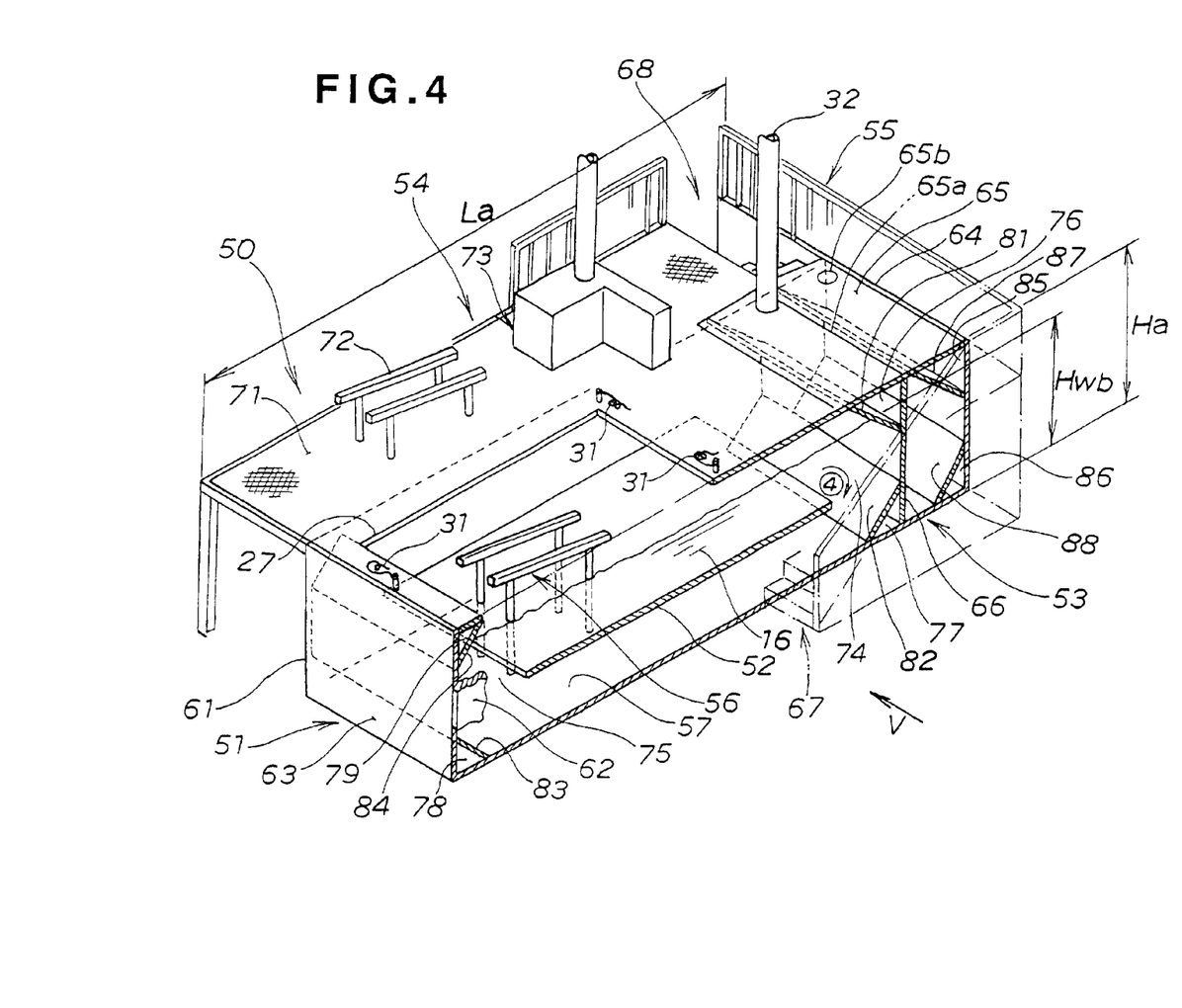
FIG. 4 is a perspective view of a personal-watercraft testing apparatus in accordance with a second embodiment of the present invention.

FIG. 4 is a perspective view of a personal-watercraft testing apparatus 50 in accordance with a second embodiment of the present invention. The same elements as those employed in the first embodiment of FIG. 1 are denoted here by the same reference characters as in FIG. 1 and will not be specifically described here to avoid unnecessary duplication.

In the personal-watercraft testing apparatus 50 of FIG. 4 including a water tank 51 and a horizontal partition plate 52 and a water flow guide 53 disposed in an underwater portion of the water tank 51, a finished personal watercraft 11 to be tested is set in the water tank 51 and predetermined items of the personal watercraft 11 are measured using measuring devices. The personal-watercraft testing apparatus 50 also includes a water-drop removing device 54, a safety fence 55 and a testing stage 56 for placing thereon the personal watercraft 11 to be tested.

The water tank 51 includes a rectangular bottom plate 57, first, second, third and fourth side plates 61, 62, 63, 64 extending upward from the respective sides of the bottom plate 57, and a top plate 65 secured to the upper ends of the first to fourth side plates 61 to 64. The water tank 51 also includes a partition plate 66 removably attached to the fourth side plate 64, and stairways 67 and 68.

Figure 5:
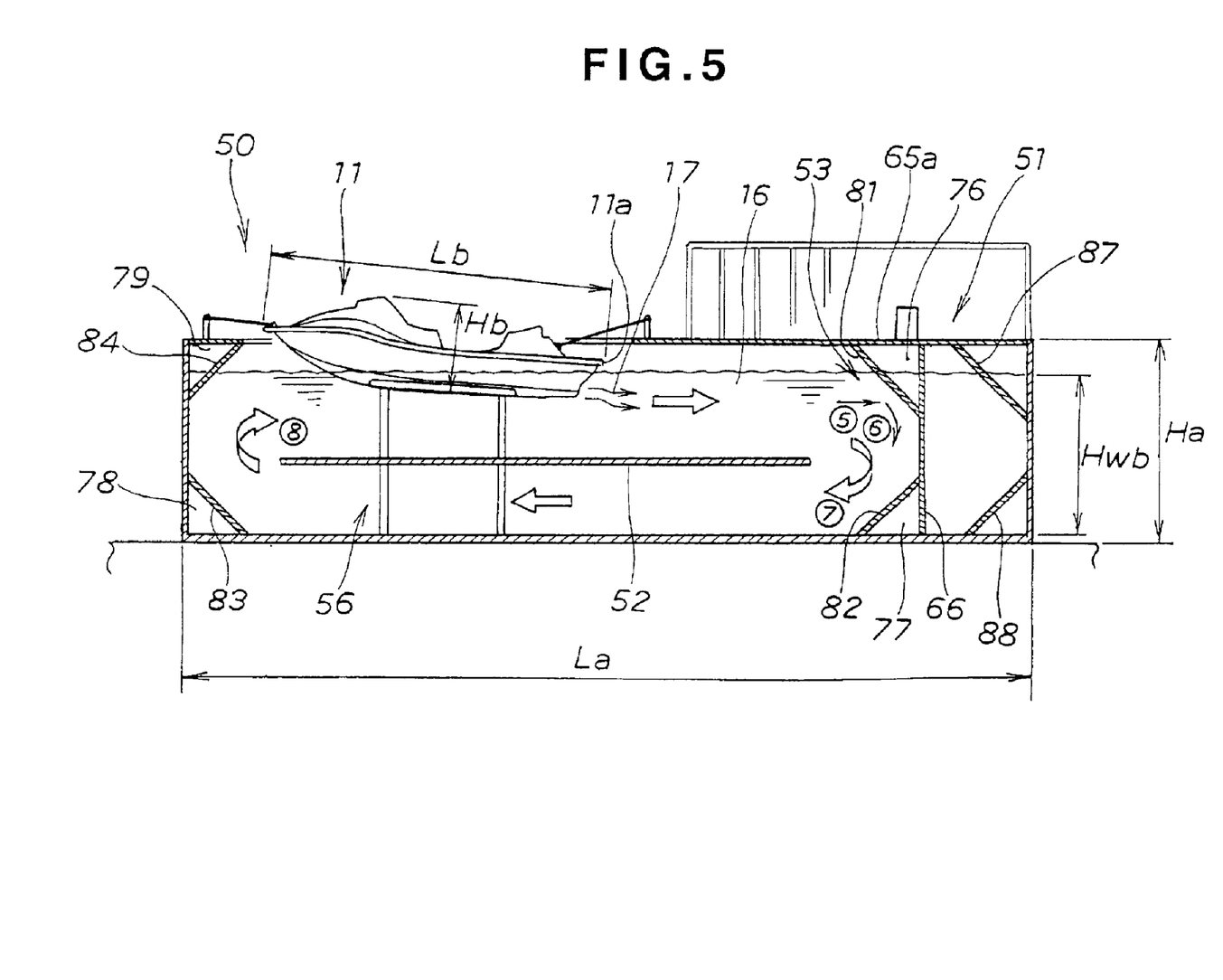
FIG. 5 is a view explanatory of behavior of the personal-watercraft testing apparatus of FIG. 4.

The water tank 51 has a length La that is at least twice as great as a length Lb of the personal watercraft 11 (see FIG. 5). The water tank 51 has a height Ha.

The water-drop removing device 54 includes a floor member 71 provided adjacent to the top plate 65 of the water tank 51, a support stand 72 mounted on the floor member 71 for vertically moving a rear end portion of the personal watercraft 11 by means of electric drive means, and an air blower 73 disposed adjacent to the support stand 72 for removing water drops adhered to the personal watercraft 11 during tests in the water tank 51.

The top plate 65, having an opening 27 greater in size than the personal watercraft 11, includes three locking members 31 secured to the plate 65 at different points near an edge portion thereof defining the opening 27, an opening/closing cover 65a mounted to the top of the partition plate 66, and an exhaust pipe 32 secured to the fourth side plate 64. The top plate 65 also has a plurality of (two in the illustrated example) exhaust holes 65b, each equipped with a lid, so that the exhaust pipe 32 can be removably mounted in a selected one of the exhaust holes 65b.

The level of water 16 in the water tank 51 is set to "Hwb" so as to provide a water depth at least twice as great as a height Hb (FIG. 5) of the personal watercraft 11.

The horizontal partition plate 52 is provided for forming a vertical circular water flow in a direction of arrow ④ in conjunction with the water flow guide 53. Specifically, the horizontal partition plate 52 is disposed substantially centrally of the height Ha (generally at a "Ha/2" position) of the underwater portion of the water tank 51. Also, a water inflow portion 74 is formed adjacent to one end of the partition plate 52, and a water outflow portion 75 is formed adjacent to the other end of the plate 52.

The water flow guide 53 functions to guide not only the water jet emitted from the personal watercraft 11 but also the vertical circular water flow. For such purposes, the water flow guide 53 includes water flow guide plates 76 to 79, respectively provided at four corners, as viewed sideways as in FIG. 5, of the underwater portion of the water tank 51. Specifically, the water flow guide 53 includes: a first upper guide plate 81 positioned at an upper corner 76 and removably attached to the partition plate 66; a first lower guide plate 82 positioned at a lower corner 77 and removably attached to the partition plate 66; a second lower guide plate 83 positioned at another lower corner 78; a second upper guide plate 84 positioned at another upper corner 79; and third upper and lower guide plates 87 and 88 positioned at corners 85 and 86, respectively, adjacent to the fourth side plate 64 behind the partition plate 66.

Further, in the second embodiment of FIG. 4, the first lower guide plate 82 can be removed along with the partition plate 66, by opening the upper opening/closing cover 65a of the partition plate 66 and then removing the first upper guide plate 81. In such a case, the exhaust pipe 32 is removed from the one exhaust hole and then mounted in the other exhaust hole 65b.

The following paragraphs describe behavior of the second embodiment of the personal-watercraft testing apparatus 50 constructed in the above-described manner, with primary reference to FIG. 5 that is a view taken in a direction of arrow "V" of FIG. 4.

As the personal watercraft 11 forces out the water jet 17 rearward of the stern 11a, the water jet 17 strikes the first upper guide plate 81 of the water flow guide 53 as denoted by arrow ⑤ and is thus guided by the guide plate 81 as denoted by arrow ⑥ and then by the first lower guide plate 82 as denoted by arrow ⑦. Further, the water jet 17 is directed along the horizontal partition plate 52 horizontally toward the front of the underwater portion of the tank 51 without going upward in a central area of the water tank 11, i.e. partway through travel along the bottom of the water tank 51. The water jet 17, having been directed via the horizontal partition plate 52 to the front portion of the watercraft 11, is further directed upward by the second lower guide plate 83 and then directed to the front portion of the watercraft 11 by the second upper guide plate 84 as denoted by arrow ⑧. In this way, the water jet 17 emitted from the personal watercraft 11 is allowed to form a vertical circular water flow that lasts continuously.

Namely, the second embodiment 50 is characterized by including: the water tank 51 having the length La at least twice as great as the length Lb of the personal watercraft 11 and the water depth (water level Hwb) at least twice as great as the height Hb of the personal watercraft 11; the horizontal partition plate 52, disposed substantially centrally of the height Ha of the underwater portion of the water tank 51, for forming a vertical circular water flow in the water tank 51; and the water flow guide plates 81 to 88, disposed at four corners 76 to 79 of the path of the vertical circular water flow. Such arrangements can form an appropriate circular water flow and thereby effectively prevent the water jet 17, forced out by the watercraft 11, from returning directly to the stern 11a and stagnating at or near the stern 11a after striking any of the side plates of the water tank 51, with the result that the personal-watercraft testing apparatus 50 can test the performance of the personal watercraft 11 under generally the same conditions as the actual use conditions.

Further, because the first lower guide plate 82 can be removed along with the partition plate 66 by opening the upper opening/closing cover 65a of the partition plate 66 and then removing the first upper guide plate 81 as noted above, the third upper and lower guide plates 87 and 88 of the water flow guide 53 can be used in place of the partition plate 66 to thereby increase the length of the underwater portion of the tank 51. As a result, even where the personal watercraft 11 to be currently tested has greater output than a last-tested personal watercraft 11, the water jet 17 can be effectively prevented from jumping out of the water tank 51, or returning directly to the stern 11a and stagnating at or near the stern 11a after striking any of the side plates of the water tank, so that the performance of high-output personal watercraft can be tested under appropriate conditions generally the same as the actual use or operating conditions of the watercraft.

Next, a description will be made about an assembly line that employs the personal-watercraft testing apparatus 50 of the present invention.

Figure 6:
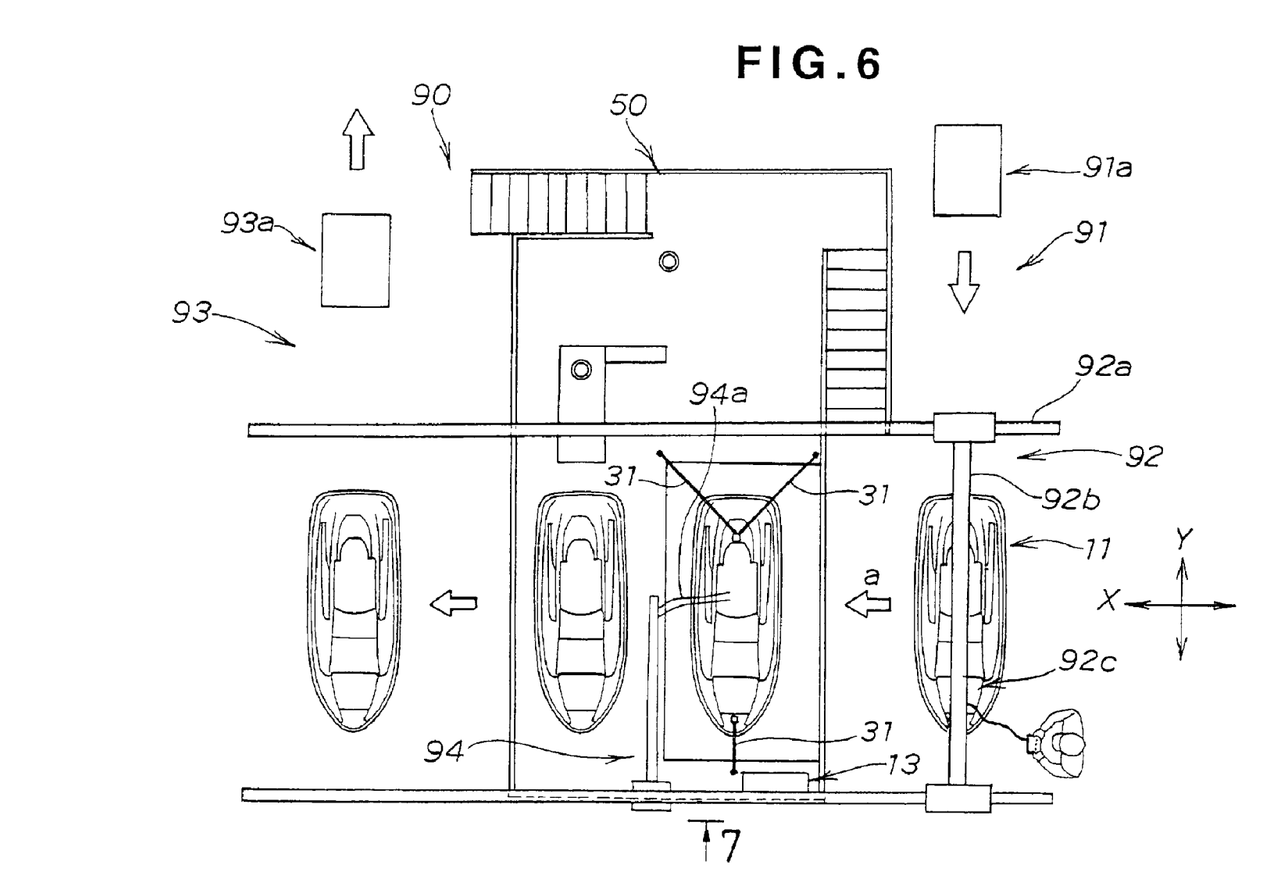
FIG. 6 is a plan view of an assembly line employing the personal-watercraft testing apparatus of FIG. 4.

FIG. 6 is a plan view of the assembly line employing the personal-watercraft testing apparatus 50 of the present invention. The assembly line 90 of FIG. 6 includes a carry-in device 91, provided on an entrance side of the testing apparatus 50, for carrying a finished personal watercraft 11 into the testing apparatus 50, a crane device 92 for lifting the personal watercraft, 11 in a suspended fashion, to move the watercraft 11 to a desired location within the testing apparatus 50, a carry-out device 93, provided on an exit side of the testing apparatus 50, for carrying the personal watercraft 11, having undergone the necessary tests, out of the testing apparatus 50, and an electric power supply device 94. Reference numerals 91a and 93a each represent a watercraft carrying cart. The crane device 92 includes first horizontal rails 92a for transferring the personal watercraft 11 in an X-axis direction, a second horizontal rail 92b extending in a Y-axis direction at right angles to the first horizontal rails 92a and movable on and along the first horizontal rails 92a, and a lift 92c for hoisting the personal watercraft 11 using a rope or the like.

Figure 7:
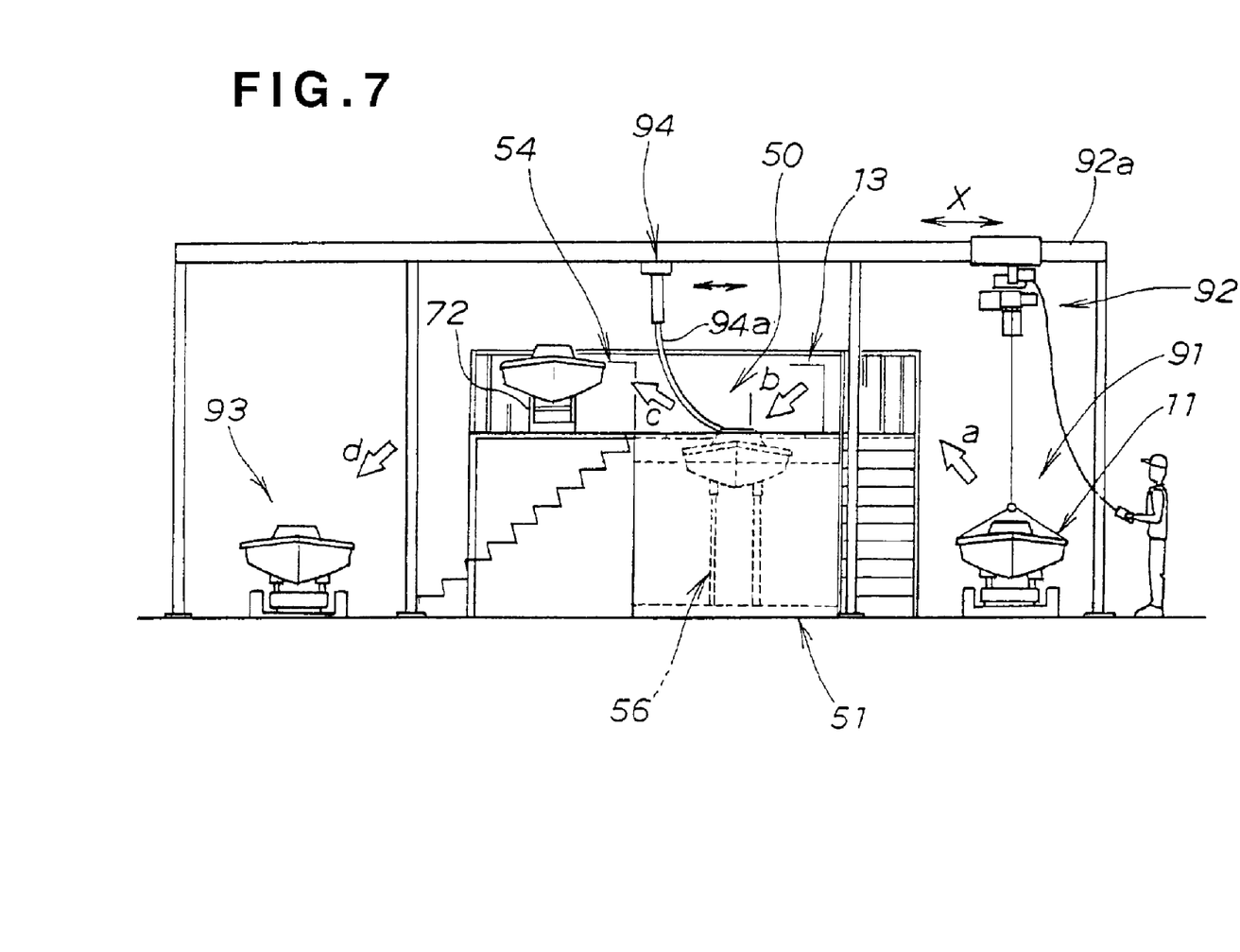
FIG. 7 is a view taken in a direction of arrow (7) of FIG. 6.

FIG. 7 is a view taken in a direction of arrow ⑦ of FIG. 6, which particularly shows the carry-in device 91, crane device 92, personal-watercraft testing apparatus 50, carry-out device 93 and electric power supply device 94. The electric power supply device 94 is capable of traveling in the X-axis direction on and along the underside of one of the first horizontal rails 92a without interfering with the lift 92c, and it supplies power to the personal watercraft 11 via a cable 94a.

The following paragraphs briefly describe how the personal-watercraft testing apparatus 50 carries and test the personal watercraft 11. First, the personal watercraft 11 is carried to a predetermined entrance position adjacent to the testing apparatus 50, lifted by the crane device 92 as note by arrow "a", and then installed on the testing stage 56 in the water tank 51 as denoted by arrow "b". After that, the personal watercraft 11 is locked on the testing stage 56 by means of the locking members 31 (see FIG. 6). Then, the cable 94a of the electric power supply device 94 is connected to a battery of the personal watercraft 11, so that the engine of the watercraft 11 is activated to perform the necessary tests of the finished watercraft 11.

After completion of the tests, the cable 94a is disconnected from the battery and the locking members 31 are disengaged from the personal watercraft 11. Then, the personal watercraft 11 is lifted again by the crane device 92 to be transferred onto the stand 72 of the water-drop removing device 54, as denoted by arrow "c", so that water drops adhered to the watercraft 11 during the tests are removed by the water-drop removing device 54. Finally, the personal watercraft 11 is lifted again by the crane device 92 to be transferred to the carry-out device 93 as denoted by arrow "d". In this way, one test cycle is completed.

Time required for one test cycle is set to be shorter than a time required for the personal watercraft 11 to be carried to the predetermined entrance position in the assembly line, so that another personal watercraft 11 to be next tested can be set in the predetermined entrance position when preparations for initiating a next test cycle have been completed. By employing the personal-watercraft testing apparatus 50 in the assembly line, the performance of each finished personal watercraft 11 can be tested at speed synchronized to an operating speed of the assemble line. Thus, it is possible to prevent finished personal watercrafts 11 from stagnating awaiting the tests, and thereby quickly address any inconveniences caused during the tests.

It should also be appreciated that the water flow guide 15 in the first embodiment of FIG. 1 may include any desired number of the guide plates 31 rather than just three. Further, the respective arcuate lengths of the guide plates 31 may be chosen arbitrarily. Furthermore, whereas the first embodiment of FIG. 1 has been described above as including the water flow guide 15 only in one position of the testing apparatus, such water flow guides 15 may be provided in two or more different positions of the testing apparatus.

In the present invention, the water jet, emitted rearward of the stern of the personal watercraft to be tested, strikes the guide plates of the water flow guide and is thus directed by the guide plates to make a U-turn, so that a horizontal circular flow is produced in the water. Then, a leading portion of the water flow is guided linearly along the vertical partition plate toward a front portion of the watercraft without forming vortical currents in a center area of the water tank; in this way, the horizontal circular flow can last continuously and smoothly with no significant resistance. As a result, the present invention can effectively prevent the water jet of the personal watercraft from returning directly to the stern and stagnating at or near the stern after striking any of the side plates of the water tank, so that the performance of the personal watercraft can be tested under generally the same conditions as the actual use or operating conditions of the watercraft.

Also, in the present invention, the water jet, emitted rearward of the stern of the personal watercraft to be tested, is directed by the water flow guide plates to sequentially flow along the water surface, then downward toward the bottom of the water tank, then along the tank bottom, and thence upward toward a front portion of the watercraft. At that time, the horizontal partition plate provided generally centrally of the height of the underwater portion of the water tank functions to lead the water jet toward the front portion of the watercraft while preventing the water from going up partway through the travel along the water tank bottom, so that the vertical circular flow can last continuously and smoothly. As a result, the present invention can effectively prevent the water jet of the watercraft from returning to the stern of the watercraft and stagnating at or near the stern after striking any of side plates of the water tank, and thus the performance of the personal watercraft can be tested under generally the same conditions as the actual use or operating conditions of the watercraft.

The present disclosure relates to the subject matter of Japanese Patent Application No. 2001-364170, filed Nov. 29, 2001, the disclosure of which is expressly incorporated herein by reference in its entirety.

What is claimed is:

1. A testing apparatus comprising:
   a personal watercraft; and
   a water tank that receives the personal watercraft, which is to be tested, said water tank comprising:
   a water flow guide plate, positioned rearward of a stem of the personal watercraft, for guiding a water jet emitted from the personal watercraft to make a U-turn toward a front portion of the personal watercraft; and a vertical partition plate, positioned generally centrally of a width of an underwater portion of said water tank and extending vertically in the underwater portion, for directing the water jet, guided by said water flow guide plate, to form a horizontal circular water flow circulating horizontally in the water tank around said vertical partition plate.

2. The testing apparatus as claimed in claim 1, wherein the personal watercraft to be tested is set in said water tank along one surface of said vertical partition plate, and said water flow guide plate has an arcuate shape convexly curved outwardly of said water tank.

3. The testing apparatus of claim 1, wherein said water flow guide plate is a first water flow guide plate and further comprising second and third water flow guide plates positioned rearward of the stem and rearward of the vertical partition plate, said first, second and third water flow guide plates having the same degree of curvature and being spaced from sidewalls of the water tank.

4. The testing apparatus of claim 1, wherein said water tank further comprises a stage that is adapted to receive said personal watercraft, said stage being disposed underwater.

5. A testing apparatus comprising:

a personal watercraft; and, a water tank, said water tank being adapted to receive said personal watercraft such that said watercraft is disposed within water contained in said water tank and said water tank surrounds said watercraft, said water tank comprising:

water flow guide plates, respectively provided at four corners, as viewed sideways, of an underwater portion of said water tank, for sequentially guiding a water jet emitted from the personal watercraft to form a vertical circular water flow; and a horizontal partition plate, provided generally centrally of a height of the underwater portion of said water tank and extending horizontally in the underwater portion, for directing the water jet, guided by said water flow guide plates, to vertically circulate around said horizontal partition plate.

6. The testing apparatus of claim 5, wherein said water tank further comprises a stage that is adapted to receive said personal watercraft, said stage being disposed underwater.

* * * * *